United States Patent [19]

Rackman

[11] Patent Number: 4,670,857

[45] Date of Patent: Jun. 2, 1987

[54] CARTRIDGE-CONTROLLED SYSTEM WHOSE USE IS LIMITED TO AUTHORIZED CARTRIDGES

[76] Inventor: Michael I. Rackman, 1710 Glenwood Rd., Brooklyn, N.Y. 11230

[21] Appl. No.: 315,204

[22] Filed: Oct. 26, 1981

[51] Int. Cl.[4] .......................... G06F 5/00; H04L 9/00
[52] U.S. Cl. ................... 380/4; 340/347 DD; 364/900; 380/5; 380/23; 380/30
[58] Field of Search .................. 364/200, 900; 178/22.01, 22.02, 22.03, 22.04, 22.05, 22.06, 22.07, 22.08, 22.09, 22.10, 22.11, 22.12, 22.13, 22.14, 22.15, 22.16, 22.17, 22.18, 22.19, 22.20, 22.21

[56] References Cited

U.S. PATENT DOCUMENTS

| | | | |
|---|---|---|---|
| 4,120,030 | 10/1978 | Johnstone | 364/200 |
| 4,168,396 | 9/1979 | Best | 178/22.06 |
| 4,218,582 | 8/1980 | Hellman | 178/22.11 |
| 4,218,738 | 8/1980 | Matyas et al. | 178/22.08 |
| 4,278,837 | 7/1981 | Best | 178/22.09 |
| 4,301,327 | 11/1981 | Lee et al. | 364/900 |
| 4,306,111 | 12/1981 | Lu et al. | 178/22.1 |
| 4,306,289 | 12/1981 | Lumley | 364/200 |
| 4,319,079 | 3/1982 | Best | 364/900 |
| 4,365,110 | 12/1982 | Lee et al. | 178/22.1 |

Primary Examiner—Eddie P. Chan
Attorney, Agent, or Firm—Gottlieb, Rackman & Reisman

[57] ABSTRACT

A cartridge-controlled system whose use is limited to authorized cartridges. Blocks of instructions of a program designed to run on the machine are encrypted by the machine manufacturer using the private key of a public-key cryptosystem pair. The machine, during an initialization step following the insertion of a new cartridge, decrypts information strings stored in the cartridge through use of the associated public key, and stores the resulting decrypted instructions in random access memory. The machine microprocessor then accesses the instructions in the random access memory. Although the public key may be widely known, as long as the private key is kept secret, there is no way for an unauthorized software/cartridge supplier to encrypt a program such that following decryption in the machine there will result an intelligible sequence of instructions.

8 Claims, 4 Drawing Figures

CARTRIDGE-CONTROLLED SYSTEM WHOSE USE IS LIMITED TO AUTHORIZED CARTRIDGES

This invention relates to cartridge-controlled systems, and more particularly to such a system whose use is limited to authorized cartridges.

There are many microprocessor-controlled systems which operate in accordance with a series of instructions stored in interchangeable read-only memories (ROM). Typical among such systems are the video game units which are sold for home use. Such a unit is connected to a television receiver, and a cartridge, containing a ROM, is inserted in a slot provided for this purpose. The cartridge furnishes the instructions for controlling the microprocessor operation which, in turn, controls the television display, reading of a keypad, etc. A common use for such systems is the playing of games. For each game which may be played, a different cartridge is provided.

The microprocessors employed in such systems are often standard, off-the-shelf components. Even in the case of specially-designed microprocessors or hard-wired control systems, the instruction set which may be executed is usually known. This allows manufacturers other than the machine manufacturer to market original cartridges for use with the machine. All that a competing game-supplier has to do, for example, is design his own game, store the instructions in a ROM, and then market a cartridge containing the ROM. There is often no way to prevent the marketing of "compatible" cartridges, that is, cartridges which will control the machine operation using the same set of instructions (albeit in different sequences to control different games or programs), by a competing "software" supplier.

It is a general object of my invention to provide a cartridge-controlled system whose use is limited to cartridges authorized by the machine manufacturer.

It is to be understood that the present invention is not directed to the prevention of the marketing of "counterfeit" cartridges. A cartridge of the machine supplier, if copied by a competitor, will be usable with the machine to the same extent as the original; that cartridge will contain the same ROM instructions as the original. There are other ways to prevent such unauthorized duplication, for example, by protecting the cartridge by way of copyright. The present invention has as its object the prevention of the design of original "programs" which an unauthorized supplier would otherwise be able to market for use with the machine of another manufacturer. Although the illustrative embodiment of the invention is disclosed in the context of a cartridge-controlled machine, it is to be understood that the principles of the invention apply to systems which are controlled by other types of insertable storage media. For example, the principles of the invention may be applied to programs furnished on discs designed for use with a microcomputer.

The crux of the invention resides in designing the machine such that unauthorized cartridge manufacturers will not be able to develop programs which are intelligible to the machine (or, more accurately in the usual case, to the microprocessor which controls the machine operation). It is assumed that the actual instruction set executable by the microprocessor is of common knowledge. In prior art systems, this means that any unauthorized manufacturer can write his own program, using the instruction set of the particular microprocessor, store it on a ROM-containing cartridge or some other storage media, and sell the product to the public for use with the machine. In accordance with the principles of the invention, however, the machine is designed such that the actual instructions which control the machine operation are never stored in conventional program form in the cartridge, even in the cartridges sold by the machine manufacturer. Instead, the instructions stored in the cartridge by the authorized manufacturer are in an encrypted form. When a cartridge is first placed in the machine, the encrypted instructions are read and then decrypted; the decrypted instructions are stored in a random access memory (RAM). In the prior art, the machine usually accesses individual instructions directly from the ROM contained in the cartridge. In accordance with the invention, however, after the encrypted instructions are decrypted in the machine, they are stored in RAM in their decrypted form (i.e., a form intelligible to the microprocessor), and it is the instructions in the RAM which are then accessed.

The machine decrypts the encrypted instructions stored in any cartridge, and stores the decrypted instructions in the RAM; it is therefore assumed that anyone skilled in the art would be able to determine the decryption algorithm by analyzing the machine. However, knowledge of the decryption algorithm is not sufficient to enable the proper encryption of an instruction sequence which, following decryption, will result in an intelligible instruction sequence. In other words, the encryption algorithm cannot be determined from knowledge of the decryption algorithm alone. In order to design a program which will decrypt intelligibly, i.e., in a way which will control the machine operation in the desired way, the encryption algorithm must be known. That algorithm is known only to the machine manufacturer, and thus it is not possible for unauthorized persons to manufacture original cartridges which will work with the machine.

Of course, the machine manufacturer must take pains to ensure that the encryption algorithm does not become known. It is standard practice for a program designer to develop a program on a development system; the resulting program is then "run" on the machine to test it. (The instructions can be stored first in a programmable read-only memory which is then accessed by the microprocessor in the machine, or the program can be run directly without having to execute this intermediate step each time that a change is made.) If during the design of a program by the machine manufacturer the instruction sequence is always encrypted before testing, and especially if the machine manufacturer has numerous development systems in use, it is very possible that the encryption algorithm will become known to unauthorized personnel. For this reason, it is preferred (although not part of the present invention) that program development by the machine manufacturer be conducted on "conventional" machines which access unencrypted instructions; instead of accessing decrypted instructions stored in the machine RAM, the machines used in the development systems of the manufacturer should access the un-encrypted instructions directly. This simply means that the machines provided by the manufacturer to its own software designers should not include a mechanism for decrypting the instructions in a program, for storing them in RAM, and for accessing individual decrypted instructions in the RAM. Instead, the development system machines should access un-encrypted instructions as in the prior art. It is only after a program is finally designed that it is encrypted. A single machine for executing the encryption algorithm may be kept under lock and key, and used only during the final design step. It is the encrypted instructions which are then reproduced on insertable media such as cartridges and sold to the public.

Further objects, features and advantages of my invention will become apparent upon consideration of the following detailed description in conjunction with the drawing, in which.

Figures 1, 2, 3, 4:
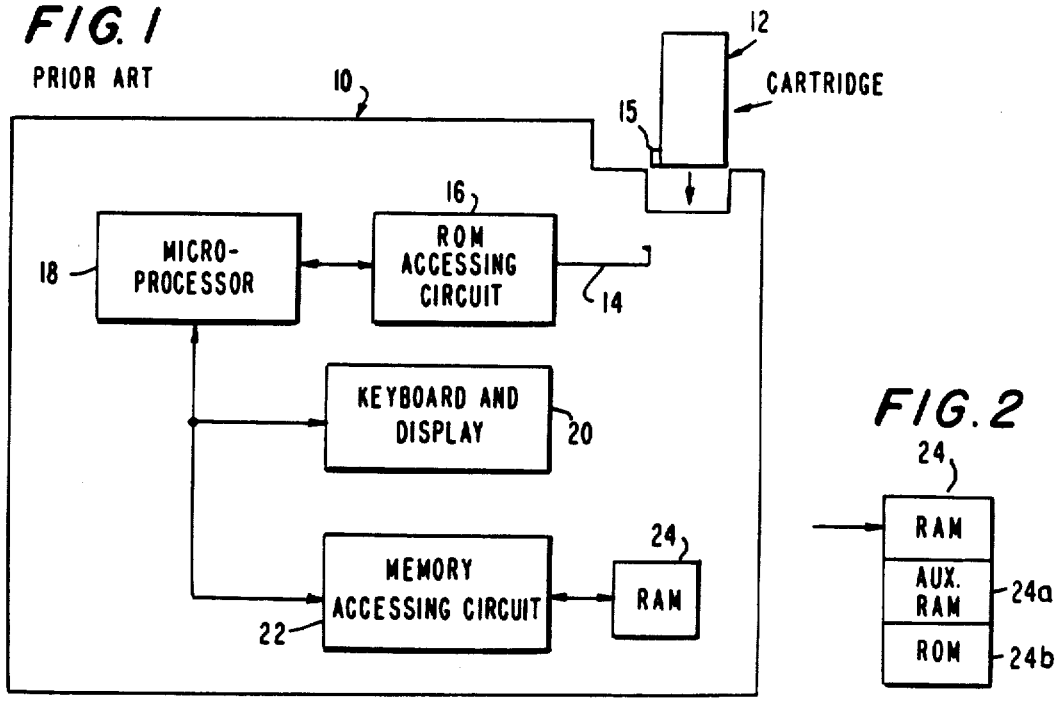
FIG. 1 depicts symbolically a prior art cartridge-controlled system.
FIG. 2 depicts symbolically the hardware modifications required in accordance with the principles of my invention.
FIG. 3 depicts symbolically the manner of operation of a prior art system such as that of FIG. 1.
FIG. 4 depicts symbolically the manner of operation of a system constructed in accordance with the principles of my invention.

FIG. 1 depicts only symbolically a prior art cartridge-controlled system. Machine 10 includes a microprocessor 18 for controlling the overall machine operation. The machine may include an integral television display, or it may be connectable to a conventional television receiver. The microprocessor communicates with keyboard and display elements 20, as well as with memory accessing circuit 22, over conventional address, data and control busses. Memory accessing circuit 22 accesses individual storage locations in RAM 24. The RAM is often used as "working memory", that is, to store data required for the running of a program as opposed to the storage of instructions for controlling the microprocessor operation.

The instructions for controlling the microprocessor operation are stored in a ROM contained in cartridge 12. The cartridge is insertable into an appropriate slot in the machine, and contacts 15 on the cartridge engage a plurality of contacts, shown by the numeral 14, connected to the ROM accessing circuit 16. The ROM accessing circuit is connected to microprocessor 18 over a conventional bus system. The microprocessor transmits an address to ROM accessing circuit 16 corresponding to the location in the cartridge ROM which contains the next instruction to be executed. The cartridge then delivers the instruction to the microprocessor via the ROM accessing circuit. While the machine may include some ROM storage, e.g., containing some initializing instructions, any program to be run on the machine is embodied in a set of instructions stored in a cartridge. Typically, each instruction is in the form of one or more bytes as is known in the art.

FIG. 3 depicts symbolically the basic sequencing of the prior art machine of FIG. 1. Following an initializing routine which may be provided, an instruction is read from the ROM contained in the cartridge. That instruction is executed, and then another instruction is fetched from the ROM. FIG. 3 does not depict how a display is formed or how a user interacts with the machine, such being well known to those skilled in the art. The flow chart is designed simply to get across the idea that sequential instructions are executed by reading them directly from the ROM in the cartridge.

The modified machine of my invention, as depicted in FIG. 2, simply requires the addition of auxiliary RAM 24a and some ROM storage 24b (or more ROM storage if some is included in the machine in the first place). The ROM 24b controls an initializing operation during which encrypted instructions in the cartridge ROM are read by the microprocessor and decrypted, the decrypted instructions then being stored in auxiliary RAM 24a. Thereafter, the microprocessor accesses auxiliary RAM 24a via memory accessing circuit 22 in order to determine the sequential instructions which are to be executed.

When a new cartridge is inserted into the machine, the microprocessor, under control of ROM 24b, reads strings of data from the ROM in cartridge 12. Each string, which may be in the order of a few hundreds bits long, is an encryption of a sequence of instructions. The microprocessor decrypts each string in accordance with the decryption algorithm controlled by the instructions in ROM 24b, and stores the decrypted instructions in auxiliary RAM 24a. It is these latter instructions which are then accessed on an individual basis in order to control running of the cartridge game or program. The last two steps shown in FIG. 4 are the same as the two steps shown in FIG. 3, except that the instructions are read from the auxiliary ROM 24a, rather than from the ROM in cartridge 12.

It is important to appreciate that the encryption and decryption operations are not performed on individual instructions per se. Were that the case, it would be a simple matter to determine the encrypted form of each instruction which ultimately controls the microprocessor operation. Unauthorized personnel would only have to compare each encrypted byte in cartridge 12 with the decrypted byte stored in auxiliary RAM 24a in order to learn how each instruction which is ultimately to control the microprocessor operation has to be encrypted in the cartridge. Instead, the instructions which ultimately control the microprocessor operation are encrypted in the form of blocks. If dozens of bytes are encrypted together, all that unauthorized personnel will be able to determine is how to encrypt groups of dozens or so instructions. This is of no aid in designing original programs for use with the machine because it is almost impossible to design a program which contains only blocks of instructions taken from other programs.

While in principle the invention is easy to understand, it is essential to utilize encryption and decryption algorithms of a special type. Since it is assumed that the machine manufacturer is the only one who knows the encryption algorithm but that the decryption algorithm (stored in ROM 24b) can be readily determined, what is required is a set of algorithms which have the following property: even though the decryption algorithm may be known, the encryption algorithm may not be determined from it. Of course, the shorter the block length of each encrypted string, the easier it is to determine the encryption algorithm from the decryption algorithm or the easier it is simply to determine a one-to-one correspondence between encrypted strings and instruction sequences. It is therefore necessary that the instructions be encrypted and decrypted in blocks long enough to prevent practical discovery of the encryption algorithm. This is a principle well known to cryptologists.

The encryption and decryption steps are preferably carried out in accordance with the principles of "public-key cryptography". This new branch of cryptography has been developed only recently. For many years, attention has been focused on the transmission of sensitive or secret messages over a communications channel. Attention has also been focused on techniques for authenticating message transmission, that is, to verify that a message incoming over a data channel indeed originated with the purported sender. Public-key cryptography is now recognized as a possible solution to both the privacy and authentication problems. One of the earliest works on the subject is that of Diffie and Hellman, "New Directions in Cryptography", IEEE Transactions on Information Theory, November, 1976. Another significant advance in the field was described in the 1977 paper by Rivest, Shamir and Adleman, entitled "On Digital Signatures And Public-Key Cryptosystems", MIT/LCS/TM-82, of the Massachusetts Institute of Technology. Perhaps the clearest exposition of the subject is to be found in the August, 1979 issue of Scientific American, in an article by Hellman entitled "The Mathematics of Public-Key Cryptography".

In its simplest form, and as originally contemplated for the transmission of messages over communications channels, each user computes or is issued a complementary pair of keys. The two keys are generally given the symbols E and D, and both are used to control operations on alphanumeric strings represented as numbers. In the Rivest-Shamir-Adleman (RSA) scheme, the two keys are commutative in the sense that if an original text is encrypted under control of key E, encryption of the encrypted text under control of key D will result in the original text, while encryptions first with key D and then with key E similarly result in the original text. The security of public-key systems resides in the extreme computational difficulty of deriving one key from the other.

In the usual case, a party to whom messages are to be sent publishes his key E in a central directory. Anyone who wishes to transmit a message to him transforms or encrypts the message with key E. Key D is known only to the receiving party, who can decrypt any incoming message with the use of this key. However, anyone else who gains access to the transmitted encrypted message will find it totally unintelligible because without key D, the transmitted message cannot be decrypted. The symbols E and D are generally used because one key is used for encryption and the other for decryption, although their roles can be exchanged, as has been noted above. Key E is referred to as the "public key" because it is published so that the whole world will know how to encrypt messages for secret transmission to the owner of the key pair. Key D is the "private key" because it is known only to the individual owning the key pair.

If privacy is of no concern but instead authentication is the goal, the party who originates the message uses his private key to transform it. Thus it is his key D, which is ordinarily used for decryption, which is used to authenticate (encrypt) a message. The party receiving the encrypted message uses the public key E of the transmitter to decrypt the incoming message in order to transform it to the original text. As long as the incoming encrypted message is saved, the receiving party can "prove" that the received message is authentic. Using the public key of the transmitter to decrypt the incoming message results in an intelligible text only if the original message was encrypted with the private key of the transmitter. Since the transmitter is the only person who has knowledge of his private key, the receipt and storage of any incoming encrypted message which can be transformed to an intelligible text using the public key of the transmitter serves as proof that he indeed sent the message.

(The way to insure both privacy and authentication is for the transmitter to doubly encrypt the message with his private key and the receiver's public key, and for the receiver to doubly decrypt the message with his private key and the transmitter's public key. Because of the commutative property of each key pair, the doublydecrypted message will be the same as the original text prior to the double encryption. Privacy is assured because only the receiver has his private key which is necessary for partial decryption. Authentication is assured because, while the whole world has the public key of the transmitter, a transmitted message which can be decrypted into text which has meaning could only have been encrypted by the possessor of the transmitter's private key.)

Because the transmitter can actually use his private key D for encryption purposes, with his public key E being used by a receiver for decryption, the symbols D and E do not necessarily always refer to decryption and encryption keys. Either can be used for encryption and either can be used for decryption. However, this is the symbology which has developed. What is common to any key pair of a "public-key cryptosystem" is that one key is public (or at least the key-pair owner does not really care if it becomes public) and one is private. What is also common to all such cryptosystems is that neither key can be determined from the other.

In a public-key cryptosystem using the RSA scheme, a message to be transmitted is first raised to the power S. The final encrypted message is the original message raised to the power S, modulo R. That is, only the remainder after the original message is raised to the power S and repeatedly divided by R is actually transmitted. The number R may be typically 300 bits in length, and the power S to which the original message is raised is typically 50 bits in length. The length of each message must, of course, be less than the length of R because the encrypted message must have at least as many bits as the original. The numbers S and R together comprise the published public key of a user. The private key comprises numbers T and R. The incoming message is raised to the power T, then repeatedly divided by the number R until the remainder is less than R. This remainder is the decrypted message.

The user keeps his private key secret, the number T being the important part of the secret since the number R is known. As described above, the reason that public-key cryptography works is that given the key S, it is virtually impossible to determine the key T. The literature referred to above describes not only the basis for public-key cryptography, but also the manner in which paired private and public keys can be generated.

The present invention is based upon the principles of public-key cryptography which relate to the authentication of messages. If a message is decrypted with the public key of a public-key cryptosystem pair and the decryption is intelligible, then it follows that the original message must have been encrypted with the associated private key of the transmitter. What is of concern in the present invention is the decryption of a "message" into "intelligible text" in the sense that the intelligible text comprises a sequence of instructions which can control the microprocessor operation. If the encryption of blocks of instructions is done in accordance with the manufacturer's private key, decryption with the public key will result in a sequence of instructions capable of controlling the microprocessor as originally contemplated by the software designer. But just as knowledge of the decryption public key is not sufficient to enable even a highly skilled mathematician to determine the private key with which to encrypt messages which will decrypt intelligibly, knowledge of the public key contained in ROM 24b of FIG. 2 will not enable competitors of the machine manufacturer to determine the private key which is necessary to encrypt a sequence of instructions in order that they decrypt properly in the machine. Of course, the competitor may design software using the standard set of instructions and store them in the ROM of a cartridge, but that cartridge will not be usable with the machine; the machine will decrypt blocks of those instructions during the initialization process and the resulting "instructions" stored in auxiliary RAM 24a will not be recognized by the microprocessor.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A plurality of mass-produced identical systems each comprising data processing means for generating memory-accessing address signals and for executing memory-furnished instructions; and means for interfacing said data processing means with an insertable cartridge having a read-only-memory contained therein; characterized by a read-write memory; said data processing means further controlling generation of memory-accessing address signals to allow accessing of blocks of encrypted instructions from the read-only-memory of an inserted cartridge, decryption of the blocks of encrypted instructions thus accessed, and generation of memory-accessing address signals to allow storage of the decrypted blocks of instructions in said read-write memory, and thereafter executing instructions furnished by said read-write memory in response to generated memory-accessing address signals; said blocks of instructions being stored in encrypted form in said read-only-memory in accordance with a private key which is associated with a public key of a public-key cryptosystem pair, and said data processing means controlling the decryption of said blocks of encrypted instructions in accordance with said public key; each of said identical systems controlling said decryption and thereafter execution of instructions furnished by its read-write memory in the identical manner responsive to insertion of the same cartridge.

2. A plurality of mass-produced identical systems in accordance with claim 1 wherein said instructions are encrypted and decrypted in blocks long enough to prevent practical discovery of said private key.

3. A method for allowing the manufacturer of a plurality of mass-produced identical ROM-cartridge controlled machines to prevent unauthorized persons from manufacturing original ROM cartridges capable of controlling machine operations, each machine including a read-write memory for storing the instructions which control the machine operation, comprising the steps of (1) controlling each machine (a) to read from a ROM cartriage blocks of encrypted instructions, to decrypt the blocks of instructions thus read, and to store the decrypted blocks of instructions in the read-write memory, and (b) thereafter to execute instructions accessed from the read-write memory, and (2) encrypting blocks of the actual instructions to be executed by any machine and storing the encrypted blocks of instructions in a ROM cartridge to be used to control any machine operation, the encryption and decryption steps being carried out respectively in accordance with the private and public keys of a public-key cryptosystem pair; each of said identical machines controlling said decryption and thereafter execution of instructions furnished by its read-write memory in the identical manner responsive to insertion of the same ROM cartridge.

4. A method in accordance with claim 3 wherein said instructions are encrypted and decrypted in blocks long enough to prevent practical discovery of said private key.

5. A plurality of mass-produced identical systems each comprising data processing means for generating memory-accessing address signals and for executing memory-furnished instructions; and means for interfacing said data processing means with an insertable storage medium having information stored therein; characterized by a read-write memory; said data processing means further controlling generation of memory-accessing address signals to allow accessing of information in the form of blocks of encrypted instructions from an inserted storage medium, decryption of the blocks of encrypted instructions thus accessed, and generation of memory-accessing address signals to allow storage of the decrypted blocks of instructions in said read-write memory, and thereafter executing instructions furnished by said read-write memory in response to generated memory-accessing address signals; said blocks of instructions being stored in encrypted form in said storage medium in accordance with a private key which is associated with a public key of a public-key cryptosystem pair, and said data processing means controlling the decryption of said blocks of encrypted instructions in accordance with said public key; each of said identical systems controlling said decryption and thereafter execution of instructions furnished by its read-write memory in the identical manner responsive to insertion of the same storage medium.

6. A plurality of mass-produced identical systems in accordance with claim 5 wherein said instructions are encrypted and decrypted in blocks long enough to prevent practical discovery of said private key.

7. A method for allowing the manufacturer of a plurality of mass-produced identical machines controlled by instructions contained in an insertable storage medium to prevent unauthorized persons from manufacturing original storage media capable of controlling machine operations, each machine including a read-write memory for storing instructions which control the machine operation, comprising the steps of (1) controlling each machine (a) to read from an inserted storage medium blocks of encrypted instructions, to decrypt the blocks of instructions thus read, and to store the decrypted blocks of instructions in the read-write memory, and (b) thereafter to execute instructions accessed from the read-write memory, and (2) encrypting blocks of the actual instructions to be executed by any machine and storing the encrypted blocks of instructions in a storage medium to be used to control any machine operation, the encryption and decryption steps being carried out respectively in accordance with the private and public keys of a public-key cryptosystem pair; each of said identical machines controlling said decryption and thereafter execution of instructions furnished by its read-write memory in the identical manner responsive to insertion of the same storage medium.

8. A method in accordance with claim 7 wherein said instructions are encrypted and decrypted in blocks long enough to prevent practical discovery of said private key.

* * * * *

(12) EX PARTE REEXAMINATION CERTIFICATE (7523rd)
United States Patent
Rackman

(10) Number: US 4,670,857 C1
(45) Certificate Issued: May 25, 2010

(54) CARTRIDGE-CONTROLLED SYSTEM WHOSE USE IS LIMITED TO AUTHORIZED CARTRIDGES

(76) Inventor: Michael L. Rackman, 1710 Glenwood Rd., Brooklyn, NY (US) 11230

Reexamination Request:
No. 90/007,353, Dec. 22, 2004

Reexamination Certificate for:
Patent No.: 4,670,857
Issued: Jun. 2, 1987
Appl. No.: 06/315,204
Filed: Oct. 26, 1981

(51) Int. Cl.
*G06F 1/00* (2006.01)
*G06F 21/00* (2006.01)

(52) U.S. Cl. .............................. 705/51; 380/30; 713/190
(58) Field of Classification Search .................... 705/51, 705/57, 59, 66; 380/30; 713/190; 235/443
See application file for complete search history.

(56) References Cited

U.S. PATENT DOCUMENTS

| | | | |
|---|---|---|---|
| 4,278,837 A | * | 7/1981 | Best .......................... 713/190 |
| 4,297,569 A | | 10/1981 | Flies |
| 4,453,074 A | | 6/1984 | Weinstein |

OTHER PUBLICATIONS

Mctaggart, Murdoch, "Introduction to cryptography, Part 3: Asymmetric cryptography" the internet article is available at URL: http://www.ibm.com/developerworks/library/s-crypt03.html.*
"JCE offers an API to leverage asymmetric cryptography" (author unknown) http://articles.techrepublic.com/5100-22-1049434.com.*
"New Directions in Cryptography", Diffie et al, IEEE, Transactions on Information Theory, vol. IT-22, No. 6, pp. 644-654, 1976.*

* cited by examiner

*Primary Examiner*—Erik Kielin

(57) ABSTRACT

A cartridge-controlled system whose use is limited to authorized cartridges. Blocks of instructions of a program designed to run on the machine are encrypted by the machine manufacturer using the private key of a public-key cryptosystem pair. The machine, during an initialization step following the insertion of a new cartridge, decrypts information strings stored in the cartridge through use of the associated public key, and stores the resulting decrypted instructions in random access memory. The machine microprocessor then accesses the instructions in the random access memory. Although the public key may be widely known, as long as the private key is kept secret, there is no way for an unauthorized software/cartridge supplier to encrypt a program such that following decryption in the machine there will result an intelligible sequence of instructions.

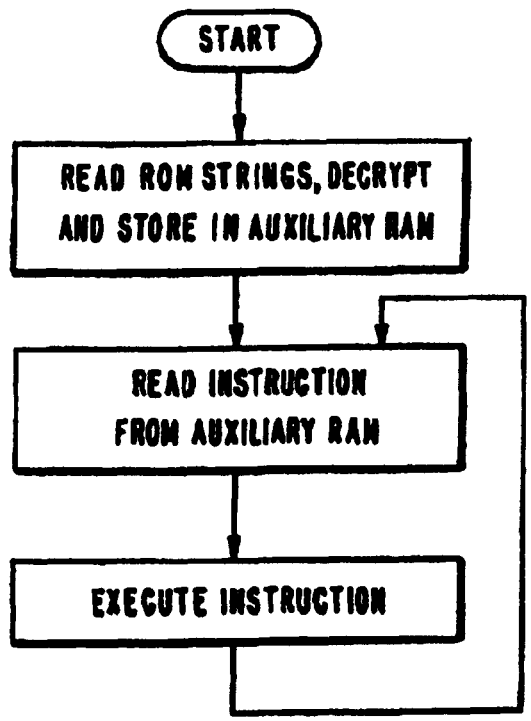

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

\* \* \* \* \*